No. 628,801.  
H. H. HEMPLER.  
TRIAL FRAME AND OPTOMETER THEREFOR.  
(Application filed July 9, 1898.)  
Patented July 11, 1899.
(No Model.)
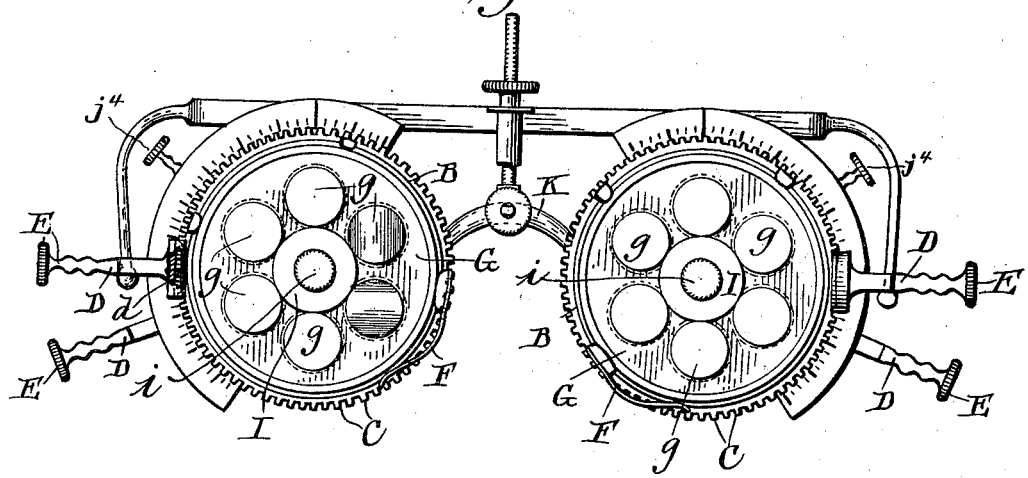
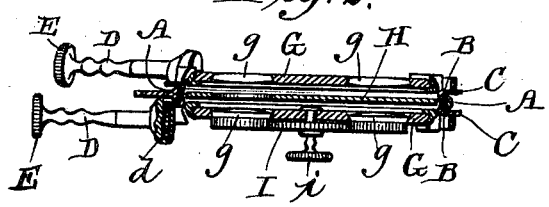
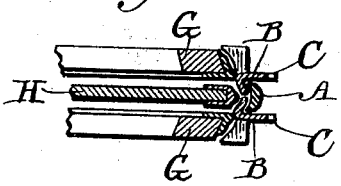
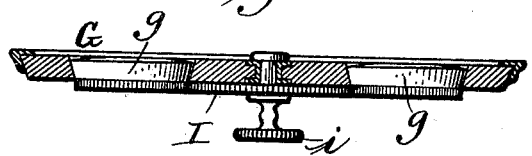
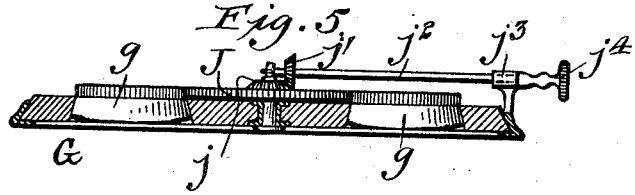
WITNESSES  
INVENTOR
THE NORRIS PETERS CO., PHOTO-LITHO., WASHINGTON, D. C.

UNITED STATES PATENT OFFICE.

HENRY HARRISON HEMPLER, OF WASHINGTON, DISTRICT OF COLUMBIA.

TRIAL-FRAME AND OPTOMETER THEREFOR.

SPECIFICATION forming part of Letters Patent No. 628,801, dated July 11, 1899.

Application filed July 9, 1898. Serial No. 685,503. (No model.)

*To all whom it may concern:*

Be it known that I, HENRY HARRISON HEMPLER, a citizen of the United States, residing at Washington, in the District of Columbia, have invented certain new and useful Improvements in Trial-Frames and Optometers Therefor; and I do hereby declare the following to be a full, clear, and exact description of the invention, such as will enable others skilled in the art to which it appertains to make and use the same.

My invention relates to optometers for trial-frames or to improvements in trial-frames which are designed to be applied on the face of the patient while his eyes are being tested; and the invention consists in certain other novel constructions, combinations, and arrangements of parts, as will be hereinafter described and specifically claimed.

In the accompanying drawings, Figure 1 is a front elevation of my improved trial-frame and optometer. Fig. 2 is a transverse section through one of the supporting-rings and disks carried thereby. Fig. 3 is an enlarged detail sectional view of a portion of one of the supporting-rings and the disks carried thereby, showing the manner of securing the same in position within the ring. Fig. 4 is a transverse section through one of the lens-disks and showing the means for revolving the lenses; and Fig. 5 is a sectional view through one of the lens-disks, showing a modified form of means for revolving each of the lenses.

In my Letters Patent No. 541,484, dated June 25, 1895, I show and describe gear mechanism for revolving the lens-frames carrying the lenses. This construction was a great improvement over the old style of trial-frame, in which the rotating lens-frames were operated in their position on the stationary frame by means of knobs placed on the outside edges thereof, and my improvements have come into general use.

In testing eyes it is found necessary in many cases to make different combinations with the lenses both in the focus and in angle by placing different kinds of lenses together—for instance, by combining two spherical lenses, as a convex with a concave or a spherical with a cylinder or a prism, and so on. Where cylinders and prismatic lenses are employed, it is necessary that they be capable of being revolved independently of the frame or disk carrying the same, and it is to accomplish these objects in the most simple and effective manner that my invention is designed.

Another object of my invention is to combine in a trial-frame disks each having a plurality of lenses varying in focal power in regular order and arranged in a circular manner, so that a number of tests can be made with the same disk without removing it from the trial-frame, and by using the disk in combination with another disk, each of which is provided with a plurality of lenses of different focal power, any number of combinations can also be made without removing the disks from the trial-frame.

A in the drawings represents two stationary circular frames forming a part of the trial-frame proper and on which are mounted two rotatable sets of frames B B for receiving and holding disks, which latter are provided with a series of lenses, the frames of each set being arranged one in front of the other. Each rotatable disk-holding frame B B is provided with a spur-gearing C C. Two independent shafts carrying at their inner ends a pinion $d$, which meshes with the gear C C on the disk-holding frames B B, are provided, so as to rotate the frames independently of each other, and each shaft is provided on its outer end with a thumb-piece E to facilitate the turning of the same. The shafts pass through laterally-disposed sleeves provided on the stationary frame at points to facilitate their manipulation. The rotatable frames B B are each provided with suitable means for receiving and holding the disks carrying lenses or a single lens, said means consisting, preferably, of a spring-clip F, as clearly shown in Fig. 1 of the drawings. While a single lens may be used in each frame B B, the said lenses being of different focal power, as in the use of sphericals or of different curvatures or angles, as in the use of cylinders and prisms, yet I prefer to employ disks G G, each of which is provided with a plurality of lenses $g$ $g$ of different focal powers, arranged, preferably, in a circular manner and in regular numerical order as to focal power, as by this construction and arrangement a number of tests can be made without removing the disks from the frame. Where two disks carrying lenses are employed, I interpose an opaque disk, as H, between the said disks, as clearly shown in Figs. 2 and 3 of the drawings. This disk is provided, preferably, with a single round aperture corresponding in size to one of the lenses $g$ in the disk G. This disk is preferably inserted into the frame between the two lens-disks G G, so as to have its opening come in line with a lens at the top or bottom of the lens-disk. By this construction and arrangement only one lens in each disk opposite each other will be exposed at a time to the vision of the patient whose eyes are being tested.

Where spherical lenses only are employed, as would be the case in making ordinary tests, it is not necessary to rotate the lenses themselves, but simply to rotate the entire disk and bring one lens at a time to view; but where cylinder or prismatic lenses are employed it is very desirable that each lens should be capable of being revolved to present different curvatures or angles independently of revolving the disks carrying the said lenses. To accomplish this object, I arrange a central frictional disk I in the lens-disks, which are provided with cylinder or prismatic lenses, so that it will bear with its periphery upon the peripheries of said lenses. This frictional disk is provided with a thumb-piece $i$, as shown in Fig. 4, by which it can be readily turned to revolve the lenses. It is obvious that this frictional disk I may be provided with gear-teeth on its periphery and engage gear-teeth on the periphery of each lens, so as to revolve the same. This location of the thumb-piece will be found convenient for revolving the lens in the outer disks—that is, the disks farthest from the eyes of the patient—but a different form of means should be provided for revolving the lens of the inner disks—that is, the disks which come next to the eyes—and for this purpose I prefer to employ the construction shown in Fig. 5, in which a centrally-arranged frictional or gear disk J is provided having a beveled gear $j$, which meshes with the beveled pinion $j'$ on the outer end of the shaft $j^2$. This shaft is supported in a suitable bearing $j^3$ and is provided on its outer end with a thumb-piece $j^4$, all as clearly shown in said Fig. 5. It will be obvious that instead of providing the frictional or gear disk J with a centrally-arranged bevel-gear it may be provided with a face or crown gear at its peripheral edge and the same result be accomplished.

K in the drawings represents an adjustable nose-piece, which is shown and described in my Letters Patent above referred to and forms no part of my present invention.

On the stationary frames are graduated scales having sight-indication marks thereon, so that the adjustment may be readily and accurately ascertained. A suitable index-pointer would be used for this purpose.

I do not wish to confine myself to the exact arrangement of the parts for revolving the disks and lenses or to the details of construction shown, as the same may be varied without departing from the spirit of my invention.

In carrying out my invention the trial-frame, which would be provided with temples, before being adjusted to the nose and eyes of the patient is fitted with lens-disks, each disk carrying a plurality of lenses, as shown in the drawings, the lenses being numbered and arranged in regular order, according to the focal power. Five tests of each eye can be made before it is necessary to remove the lens-disks for the insertion of another disk should no one of the lenses in the disks already in the frame be adapted to the eyes of the patient. A single disk carrying a plurality of lenses for each eye can be inserted first and afterward two disks inserted to make a combination-glass. Should none of the lenses or combination of lenses be suited to a patient, either or both of the lenses can be removed and another disk carrying a plurality of lenses be inserted, the great advantage of my improved trial-frame being that a number of tests can be made both with single lenses and with combination-lenses before it is necessary to remove the lens-disks and that the trial-frame is designed and adapted to be applied on the face of the patient similar to ordinary spectacles. Should the patient's vision require a complicated glass, such as a prismatic or cylinder lens, a lens-disk carrying such lens could be inserted in the trial-frame, and the proper tests can be readily and accurately secured by bringing different prismatic or cylinder lenses in line with the eye of the patient and then revolving each respective lens. I regard this as a very important feature of my invention.

Having now described my invention, what I claim as new, and desire to secure by Letters Patent, is—

1. A trial-frame adapted to be applied on the face of a patient, comprising in its construction a stationary frame proper, two rotatable frames on each end of the stationary frame, one operating in front of the other and each provided with gear-teeth, independent shafts for operating each rotatable frame, each shaft being provided with a pinion which meshes with the teeth on the rotatable frames, and removable disks carried by the rotatable frames and provided with a plurality of lenses of graduated focal powers, substantially as described.

2. A trial-frame adapted to be applied on the face of a patient comprising in its construction a stationary frame proper, two rotatable frames on each end of the stationary frame, one operating in front of the other and each provided with gear-teeth, independent shafts for operating each rotatable frame, each shaft being provided with a pinion which meshes with the teeth on the rotatable frames, and removable disks carried by the rotatable frames and provided with a plurality of lenses of graduated focal powers, and an opaque disk interposed between the two lens-disks, said disk being provided with a single sight-opening, substantially as described.

3. A trial-frame adapted to be applied on the face of a patient, comprising in its construction a stationary frame proper two rotatable frames on each end of the stationary frame, one operating in front of the other and each provided with gear-teeth, independent shafts for operating each rotatable frame, said shafts being provided with pinions which mesh with the teeth on the rotatable frames, removable disks carried by the rotatable frames and provided with a plurality of lenses of graduated focal power, and a disk provided with means for rotating the same, which disk engages the lenses to rotate the same independently of the rotation of the disks which carry said lenses, substantially as described.

In testimony whereof I hereunto affix my signature in presence of two witnesses.

HENRY HARRISON HEMPLER.

Witnesses:
LUTHER L. APPLE,
E. T. FENWICK.